(12) United States Patent
Moosmann et al.

(10) Patent No.: US 8,522,204 B2
(45) Date of Patent: Aug. 27, 2013

(54) METHOD AND APPARATUS FOR CREATING A USER PROGRAM FOR A SAFETY CONTROLLER

(75) Inventors: Peter Moosmann, Ostfildern (DE); Matthias Reusch, Hohenstein (DE); Herbert Walter, Schlierbach (DE); Andreas Heckel, Remshalden (DE)

(73) Assignee: Pilz GmbH & Co. KG, Ostfildern (DE)

( * ) Notice: Subject to any disclaimer, the term of this patent is extended or adjusted under 35 U.S.C. 154(b) by 202 days.

(21) Appl. No.: 13/208,013

(22) Filed: Aug. 11, 2011

(65) Prior Publication Data

US 2012/0036493 A1 Feb. 9, 2012

Related U.S. Application Data

(63) Continuation of application No. PCT/EP2010/000991, filed on Feb. 17, 2010.

(30) Foreign Application Priority Data

Feb. 23, 2009 (DE) .......................... 10 2009 011 679

(51) Int. Cl.
*G06F 9/44* (2006.01)
(52) U.S. Cl.
USPC .......................................................... 717/117
(58) Field of Classification Search
USPC ........................... 717/106–108, 114, 116, 117
See application file for complete search history.

(56) References Cited

U.S. PATENT DOCUMENTS 5,504,473 A 4/1996 Cecic et al.
(Continued)

OTHER PUBLICATIONS

DIN EN 954-1, Safety-related parts of control systems Part 1: General principles for design, Mar. 1997, 34 pages.

(Continued)

*Primary Examiner* — Anna Deng
(74) *Attorney, Agent, or Firm* — Harness, Dickey & Pierce, P.L.C.

(57) ABSTRACT

A method for creating a user program for a safety controller designed to control an automated installation having a plurality of sensors and a plurality of actuators involves several programming steps. The user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion. The method steps involve a step of defining a number of safety-related program variables, a step of defining a number of non-safety-related program variables, a step of selecting a safety-related program variable from the number of safety-related program variables, a step of selecting a first non-safety-related program variable from the number of non-safety-related program variables, wherein the first non-safety-related program variable is repeatedly assigned an instantaneous value when the user program is executed, a step of defining at least one assignment condition which is processed when the user program is executed, a step of defining an association which associates the selected first non-safety-related program variable with the selected safety-related program variable, wherein the instantaneous value of the selected first non-safety-related program variable is assigned to the selected safety-related program variable depending on the assignment condition, when the user program is executed.

12 Claims, 3 Drawing Sheets

(56) References Cited

U.S. PATENT DOCUMENTS

| | | | |
|---|---|---|---|
| 7,139,622 | B2 | 11/2006 | Klopfer et al. |
| 7,209,793 | B2 * | 4/2007 | Harmse et al. .................. 700/29 |
| 2004/0064205 | A1 | 4/2004 | Kloper et al. |
| 2006/0026570 | A1 * | 2/2006 | Chan et al. .................... 717/127 |
| 2007/0107057 | A1 * | 5/2007 | Chander et al. ................. 726/22 |
| 2007/0255429 | A1 | 11/2007 | Hauf |
| 2009/0030534 | A1 | 1/2009 | Dold et al. |

OTHER PUBLICATIONS

EN ISO 13849-1, Safety of machinery—Safety-related parts of control systems—Part 1: General principles for design, Nov. 2006, 97 pages.

CEI IEC 61508-2, Functional safety of electrical/electronic/programmable electronic safety-related systems—Part 2: Requirements for electrical/electronic/programmable electronic safety-related systems, May 2000, 152 pages.

* cited by examiner

METHOD AND APPARATUS FOR CREATING A USER PROGRAM FOR A SAFETY CONTROLLER

CROSS REFERENCES TO RELATED APPLICATIONS

This application is a continuation of international patent application PCT/EP2010/000991 filed on Feb. 17, 2010 designating the U.S., which international patent application has been published in German language and claims priority from German patent application DE 10 2009 011 679.6 filed on Feb. 23, 2009. The entire contents of these prior applications are incorporated herein by reference.

BACKGROUND OF THE INVENTION

The present invention relates to a method and an apparatus for creating a user program for a safety controller designed to control an automated installation having a plurality of sensors and a plurality of actuators.

A safety controller in terms of the present invention is a device or an apparatus, which picks up input signals provided by sensors and produces output signals therefrom by means of logic combinations and possibly further signal or data processing steps. The output signals can then be supplied to actuators which effect actions or reactions in a controlled installation depending on the input signals.

A preferred field of application for such safety controllers is the monitoring of emergency off pushbuttons, two-hand controllers, guard doors or light grids in the field of machine safety. Such sensors are used in order to safeguard a machine, for example, which presents a hazard to humans or material goods during operation. When the guard door is opened or when the emergency off pushbutton is operated, a respective signal is produced and supplied to the safety controller as an input signal. In response thereto, the safety controller uses an actuator, for example, to shut down that part of the machine which is presenting the hazard.

In contrast to a "standard" controller, a characteristic of a safety controller is that the safety controller always ensures a safe state for the installation or machine presenting the hazard, even if a malfunction occurs in the safety controller or in a device connected to it. Extremely high demands are therefore made of safety controllers in terms of their own failsafety, which results in high complexity for development and manufacture.

Usually, safety controllers require particular approval from competent supervisory authorities, such as the professional associations or what is called TÜV in Germany, before they are used. The safety controller must meet prescribed safety standards as set down, by way of example, in the European standard EN 954-1 or a comparable standard, such as the standard IEC 61508 or standard EN ISO 13849-1. In the following, a safety controller is therefore understood to mean a device or an apparatus which at least complies with safety category 3 of the European standard EN 954-1 or with a Safety Integrity Level (SIL) 2 of the cited standard IEC 61508.

A programmable safety controller provides the user with the opportunity to stipulate the logic combinations and possibly further signal or data processing steps individually according to his needs using a piece of software, namely the user program. This results in a great deal of flexibility in comparison with earlier solutions, in which logic combinations were produced by defined wiring between various safety chips. By way of example, a user program can be written using a commercially available personal computer (PC) and using appropriately set-up software programs.

In the case of installations based on the prior art, two programmable controllers are usually used: a safety controller for accomplishing the safety tasks and a standard controller for accomplishing the standard tasks. Rarely, a joint controller may be used in order to accomplish all standard and safety tasks. In both forms of implementation, the safety tasks are accomplished by failsafe processing of safety-related program variables. To this end, safety sensors—which are sensors of failsafe design—capture safety-related variables and supply them by means of safety-related control input signals to the safety controller or the joint controller. The controller uses safety-related program variables to determine values for safety-related control output signals. These control output signals are used to actuate safety actuators—which are actuators of failsafe design—to perform safety-related actions. The standard tasks are accomplished by processing non-safety-related program variables, which do not require failsafe processing. To this end, standard sensors capture non-safety-related variables, which may be called process-related variables. Non-safety-related control input signals are used to supply these variables to the standard controller or the joint controller. The controller uses the non-safety-related program variables to determine values for non-safety-related control output signals. These control output signals are used to actuate standard actuators, which then perform non-safety-related actions.

In both forms of implementation, the safety tasks require the use of expensive—because they are of failsafe design—sensors. Up to now, it is not possible to employ inexpensive non-failsafe design standard sensors, nor to use values of non-safety-related program variables for safety-related control operations.

SUMMARY OF THE INVENTION

In view of the above, it is an object to provide a method and an apparatus which allow increased flexibility in the process of creating a user program with safety-related functions.

It is another object to provide a method and an apparatus which allow to reduce costs in the process of creating a user program with safety-related functions.

It is yet another object to provide a method and an apparatus which allow simpler, faster and clearer programming of a safety controller.

In view of the above, there is provided a method for creating a user program for a safety controller which is designed to control an automated installation having a plurality of sensors and a plurality of actuators, wherein the user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion, the method comprising the following steps: defining a number of safety-related program variables; defining a number of non-safety-related program variables; selecting a safety-related program variable from the number of safety-related program variables; selecting a first non-safety-related program variable from the number of non-safety-related program variables, wherein the first non-safety-related program variable is repeatedly assigned an instantaneous value when the user program is executed; defining at least one assignment condition which is processed when the user program is executed; defining an association which associates the selected first non-safety-related program variable with the selected safety-related program variable, wherein the instantaneous value of the selected first non-safety-related program variable is assigned to the selected safety-related program variable depending on the assignment condition, when the user program is executed.

There is also provided an apparatus for creating a user program for a safety controller designed to control an automated installation having a plurality of sensors and a plurality of actuators, wherein the user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion, comprising first units for defining a number of safety-related program variables and for selecting a safety-related program variable from the number of safety-related program variables, comprising second units for defining a number of non-safety-related program variables and for selecting a first non-safety-related program variable from the number of non-safety-related program variables, wherein the first non-safety-related program variable is repeatedly assigned an instantaneous value during the execution of the user program, comprising third units for defining at least one assignment condition which is processed during the execution of the user program, and comprising fourth units for defining an association which associates the selected first non-safety-related program variable with the selected safety-related program variable, wherein the instantaneous value of the selected first non-safety-related program variable is assigned to the selected safety-related program variable on the basis of the assignment condition when the user program is executed.

There is also provided a computer program product comprising a storage medium having stored program code for carrying out a method for creating a user program for a safety controller which is designed to control an automated installation having a plurality of sensors and a plurality of actuators, wherein the user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion, the method comprising the following steps: defining a number of safety-related program variables; defining a number of non-safety-related program variables; selecting a safety-related program variable from the number of safety-related program variables; selecting a first non-safety-related program variable from the number of non-safety-related program variables, wherein the first non-safety-related program variable is repeatedly assigned an instantaneous value when the user program is executed; defining at least one assignment condition which is processed when the user program is executed; defining an association which associates the selected first non-safety-related program variable with the selected safety-related program variable, wherein the instantaneous value of the selected first non-safety-related program variable is assigned to the selected safety-related program variable depending on the assignment condition, when the user program is executed.

The novel method and the novel apparatus are based on the idea of assigning the instantaneous value of a selected first non-safety-related program variable to a selected safety-related program variable on the basis of an assignment condition when the user program is executed, and therefore, in more general terms, of converting a non-safety-related program variable into a safety-related program variable. This increases the flexibility when writing a user program. For the purpose of accomplishing safety tasks, not only safety-related program variables and safety-related signals represented thereby are available, but also non-safety-related program variables and non-safety-related signals represented thereby. The number of options for implementing a programming individual safety tasks is therefore increased.

The increase in programming flexibility is also achieved by allowing the creator of the user program to freely define the required assignment condition. It is therefore possible for various non-safety-related program variables and physical signals represented thereby to be used for the conversion.

The assignment of an instantaneous value of a selected first non-safety-related program variable to a selected safety-related program variable helps to reduce the number of sensors of failsafe design for the purpose of providing instantaneous values of the safety-related program variable. A physical signal which is represented by the safety-related program variable can therefore also be captured using a sensor of non-failsafe design. This helps to reduce the costs.

The conversion of a non-safety-related program variable into a safety-related program variable essentially requires only an assignment condition and an association to be defined. This allows clear, simple and therefore fast programming of a safety controller, which also helps to increase failsafety.

In a refinement of the invention, the assignment condition represents a test which is used to determine whether the selected first non-safety-related program variable meets a reliability requirement which is demanded for safety-related program variables.

This refinement ensures that failsafe operation of the safety controller is possible despite the transfer of instantaneous values from a non-safety-related program variable to a safety-related program variable. In order to accomplish safety tasks, it is therefore also possible to use non-safety-related program variables and variables represented thereby in addition to safety-related program variables and the physical variables represented thereby. Furthermore, to increase failsafety, the value of the selected first non-safety-related program variable is assigned to the selected safety-related program variable only when the assignment condition is met.

With a view to a technical system, reliability is understood to mean dependability in respect of continual correct provision of an agreed service within defined probability limits and time periods. Reliability is therefore a degree of confidence that appears justified on the basis of low failure probability, high correctness probability or a low breakdown or failure rate.

The reliability requirement demanded for safety-related program variables primarily defines a correctness probability for the instantaneous values of said variables. By way of example, the reliability requirement may prescribe that the instantaneous value of a safety-related program variable matches an actually available value for a physical signal at all events with a negligible low discrepancy. Usually, this reliability requirement is met using sensors of failsafe design. It is therefore possible to identify errors during the capture of a physical variable and to observe the demanded correctness probability. Whether or not the demanded reliability requirement is met is advantageously determined by evaluating the instantaneous value of the selected first non-safety-related program variable.

In a further refinement of the invention, the assignment condition defined is a plausibility test which is used to check whether the selected first non-safety-related program variable and a selected further program variable are consistent with one another.

This refinement allows a high level of flexibility, since the free selection of a further program variable provides many options for defining a plausibility test. In addition, a plausibility test can be implemented using two program variables without any great complexity.

The check to determine whether the two program variables are consistent with one another is used to establish whether the two program variables are in tune with one another. In other words: it is established whether the two program variables match. This check is based on the following assumption: ideally, both the selected first non-safety-related program variable and the selected further program variable represent the same physical signal, for example a speed signal or a distance signal. However, this check can also be performed for the case in which the two program variables represent different physical signal but ones which are related by means of a physical law. In this case, however, one of the two program variables requires that the instantaneous values thereof be converted taking account of the physical law.

Advantageously, the check is performed by evaluating the instantaneous values of the two program variables.

The evaluation of the instantaneous values involves a check to determine whether the instantaneous values of the two program variables meet a defined criterion. In principle, numerous criteria are suitable for this purpose. Firstly, it is possible to use a criterion which is directed to the instantaneous values as such. In this case, a check is performed to determine whether the instantaneous values as such show a consistent response. By way of example, it is possible to check whether a difference formed from the two instantaneous values is smaller than a defined threshold or whether a quotient formed from the two instantaneous values is within a defined range around 1. Secondly, it is possible to use a criterion which is directed to the timing response of the instantaneous values. Hence, a check is performed to determine whether the instantaneous values exhibit a consistent timing response. In this case, a time derivation may be ascertained for the two program variables, advantageously approximately in the form of a difference quotient. In the case of this criterion too, it is possible to evaluate a difference of a quotient in appropriate fashion, as described above. The use of a criterion oriented to the timing response has the advantage that a discrepancy between the two program variables can be determined at a very early time, long before a significant discrepancy becomes noticeable in the instantaneous values themselves. Advantageously, the instantaneous values of the two program variables which are used for forming the difference or the quotient are each in pairs at a particular time before or within a small time interval.

Advantageously, a plurality of criteria is combined with one another. This allows very reliable plausibility tests to be created, which results in a high level of failsafety.

Preferably, the selected further program variable is a non-safety-related program variable. In this case, a safety-related program variable can be generated solely using non-safety-related program variables, which results in a very high level of flexibility.

In a further refinement of the aforementioned measure, both the selected first non-safety-related program variable and the selected further non-safety-related program variable are a program input variable, wherein the selected first non-safety-related program variable is assigned an instantaneous value which represents a value of a first sensor signal determined using a first sensor, and wherein the selected further non-safety-related program variable is assigned an instantaneous value which represents a value of a second sensor signal determined using a second sensor. It is therefore a simple matter to use two sensors of non-failsafe design to convert a non-safety-related program variable into a safety-related program variable.

In a further refinement of the aforementioned measure, the two sensors are advantageously of diversitary design. The two sensors are therefore used to capture the same physical signal, albeit using different measurement principles. By way of example, the physical signal can be captured on a voltage basis using one sensor and on a current basis using the other sensor. This measure ensures a very high level of failsafety.

Suitable selection or combination of the two sensors also allows compensation for external influences, such as temperature drift or the like.

Alternatively, the selected further program variable used may also be a safety-related program variable, which helps to further increase the flexibility.

In a further refinement of the invention, the assignment condition defined is a plausibility test which is used to check whether the selected first non-safety-related program variable meets a comparison criterion, wherein the comparison criterion represents a characteristic property of the selected first non-safety-related program variable.

This refinement has the advantage that it is possible to determine whether the reliability requirement is met using solely the selected first non-safety-related program variable. A further program variable is not needed. This refinement allows a high level of flexibility and simple implementation. If the selected first non-safety-related program variable is a program input variable, there is accordingly no need for a further sensor for converting a non-safety-related program variable into a safety-related program variable. This allows very inexpensive conversion.

Overall, various comparison criteria are conceivable. Firstly, it is possible to use a comparison criterion which is directed to the instantaneous values as such. By way of example, this is a range which is expected to contain the instantaneous values of the selected first non-safety-related program variable. This range can be prescribed by a maximum value which is normally to be expected and by a minimum value which is normally to be expected. Secondly, it is possible to use a comparison criterion which is directed to the timing response of the instantaneous values. By way of example, this is a range which is expected to contain the time gradient determined for increasing instantaneous values. A corresponding procedure can be used for decreasing instantaneous values.

More advantageously, the comparison criterion is compiled from a plurality of single tests. Thus, by way of example, the comparison criterion may contain both guidelines for the instantaneous values as such and guidelines for the timing response of the instantaneous values. It is therefore possible to check whether the instantaneous values, starting from a first value level, assume a second value level within a defined period of time and whether the instantaneous value which is available after the period of time is within a defined range. A corresponding scenario is also possible for decreasing instantaneous values. It is also possible for a comparison criterion to be defined for first increasing and then decreasing instantaneous values.

In a further refinement of the invention, the user program comprises a plurality of conversion instructions, wherein the conversion instructions represent the association and the assignment condition, wherein at least some of the conversion instructions are contained in the first program portion.

The conversion instructions are therefore contained in that program portion in which safety-related program variables are processed in failsafe fashion and which contains safety control instructions for actuating safety actuators. Therefore, failsafety is achieved even when a non-safety-related program variable is converted into a safety-related program variable. This means that the safety-related program variable resulting from the conversion is failsafe, whereas the non-safety-related program variable continues to be non-failsafe. Advantageously, all conversion instructions are contained in the first program portion.

In a further refinement of the invention, a first code component representing the association and a second code component representing the assignment condition are combined to form a program module.

This refinement relates to the source code for the user program. Accordingly, the two code components are combined to form a block in the source code. The source code therefore contains a dedicated conversion point at which the conversion instructions are combined. Both the association and the assignment condition are relevant to failsafety and are therefore also checked as part of an approval procedure to be performed by a supervisory authority. The block formation within the source code simplifies the approval procedure. Preferably, the program module is contained in the first program portion.

A dedicated conversion point enables the writer of a user program to obtain—without any great complexity—an overview of where a non-safety-related program variable is used to generate a safety-related program variable or what safety-related program variable can be attributed to a non-safety-related program variable. If a user program contains a plurality of conversions, i.e. if a plurality of non-safety-related program variables are each converted into a safety-related program variable, then the user program contains a plurality of independent program modules. For each conversion, a dedicated conversion point exists.

A further advantage is that the combination to form a program module allows encapsulation. Encapsulation results in the program module being able to be reused as often as desired, just as a function, by using appropriate calls.

The combination of the two code components to form a program module is advantageously effected automatically by that computer program which is used to write the user program.

In a further refinement of the invention, the user program is created using a computer program running on a computer, wherein the computer program comprises a display module, wherein the display module causes a user program source code to be displayed on a display unit connected to the computer during the creation of the user program by means of a plurality of graphical source code symbols representing said source code, wherein the graphical source code symbols are implemented in a basic form of presentation, wherein the plurality of graphical source code symbols comprises a number of graphical conversion code symbols which represent a conversion code contained in the source code, wherein the conversion code comprises a first code component, which represents the association, and a second code component, which represents the assignment condition, wherein the computer program also comprises an identification module which is used to identify at least one of the two code components, wherein the presence of an identified code component causes the display module to present at least one graphical conversion code symbol, which is contained in the number of graphical conversion code symbols, in a form of presentation which is modified in comparison with the basic form of presentation.

The presentation of a modified graphical conversion symbol prompts marking in the presentation of the user program. It is therefore possible for the writer of a user program to locate without difficulty the extent representing the conversion code, i.e. the dedicated conversion point, in the user program. Those extents of the user program which stem from the conversion of a non-safety-related program variable into a safety-related program variable are therefore easily identifiable. The writer can therefore subject them to a critical check as required, which is also advantageous for a licensing procedure.

The presentation of a modified graphical conversion symbol and hence the marking in the presentation of the user program are effected automatically by that computer program which is used to write the user program. The writer of the user program does not have to take any additional action beyond that which normally needs to be taken to write a user program.

Advantageously, those graphical conversion symbols which represent the first code component are presented in a modified form of presentation. In addition, it is also possible for those graphical conversion symbols which represent the second code component to be presented in a modified form of presentation.

A plurality of refinements are conceivable for presenting the source code for a user program using a plurality of graphical symbols. In a first refinement, the user program is written by means of text input. The user program is therefore in the form of a structured text, for example. In this case, the graphical source code symbols correspond to individual letters, digits and possibly special characters. In this refinement, it is conceivable to show at least some of the letters which represent the first code component in modified form. By way of example, this can be done by virtue of these letters being presented in a color which is changed in comparison with the basic form of presentation. As an alternative or in addition, these letters can also be presented in a text style which is changed in comparison with the basic form of presentation, for example italics or bold. It is also conceivable for these letters to be indented, for example, or for that line which contains the first letters to have appropriate characters placed in front. By way of example, it is possible for asterisks or a special text such as "There follows a safety-related conversion code!" to be placed in front. Characters are placed in front by inserting a further line. In addition, appropriate characters can also be inserted after that line which contains the last letters.

In a preferred refinement, the identification module is used to identify the first code component.

The identification of the first code component and the associated marking of this code component have the advantage that the selected first non-safety-related program variable involved in the conversion and the selected safety-related program variable can be ascertained quickly in the presentation of the user program. The writer of a user program can therefore obtain comprehensive information. He can immediately identify which program variable is the basis for the conversion and which program variable is generated by the conversion.

Advantageously, the first code component is identified from the fact that a non-safety-related program variable is read in a cohesive code component, and the instantaneous value which is read in this context is assigned to a safety-related program variable.

As a result of the identification of the first code component, the program variables involved in the conversion are known per se. This allows additional extents of the user program to be marked for the purpose of more comprehensive assistance for the writer of a user program. Preferably, it is also possible to mark those extents which represent the assignment condition. This prompts even more conspicuous marking in the presentation of the user program.

In a particularly advantageous refinement, both code components are identified. In this case, the at least one graphical conversion code symbol is presented when both code components are present in the form of presentation which is modified in comparison with the basic form of presentation. In addition, it is also possible for all conversion code symbols to be presented in the modified form of presentation.

With respect to the creation of a user program and the resulting presentation of the user program, a further refinement is conceivable. In this case, the user program is written using graphical symbols in the form of what is known as a function block diagram. In this refinement, different types of graphical symbols are used, for example rectangles, which represent selected function blocks, letters and wildcard symbols. In this refinement, usable and hence selectable program modules are stored in a database. For each of these program modules, a small wildcard symbol is created in a symbol bar. When such a wildcard symbol is selected using a drag-and-drop function and dropped in an area provided for this purpose in a graphical interface, the corresponding point on the graphical interface presents a function block which represents the selected program module. It is also possible to add to the database program modules while the user program is being written. One example is a program module which represents the association and the assignment conditions.

Accordingly, in a further refinement of the invention, the user program is created using a computer program running on a computer, wherein the user program is created by selecting a number of program modules from a plurality of predefined program modules, wherein the computer program comprises a display module which displays a plurality of graphical program module symbols on a display unit connected to the computer, wherein the plurality of graphical program module symbols comprises a first number of graphical program module symbols which represent the predefined program modules, and a second number of graphical program module symbols which represent the number of selected program modules, wherein at least the first number of graphical program module symbols are implemented in a basic form of presentation, wherein the number of predefined program modules comprises a program module which was written during the creation of the user program and which represents the association and the assignment condition, wherein the written program module is represented by at least one modified graphical program module symbol, wherein the display module displays the modified graphical program module symbol in a form of presentation which is modified in comparison with the basic form of presentation.

This refinement reliably refers the writer of a user program to those extents of the user program which can be attributed to the conversion and which, besides the extents of the user program which represent the actual safety tasks, are relevant in terms of failsafety. In this context, the extents which relate to the conversion need to be observed in particular, since this involves program variables which can be attributed to non-safety-related program variables being used in the first program portion. As far as the extent of the modified graphical program module symbols is concerned, it is thus conceivable to modify only that wildcard symbol which represents that program module which represents the association and the assignment condition. In addition, it is likewise possible to modify all function blocks written in the user program which represent this program module. Advantageously, this refinement also involves the first code component being identified.

Advantageously, the modified graphical program module symbol is used when the written program module is identified as comprising both a first code component and a second code component. The use of a modified graphical program module symbol draws the attention of the writer of a user program to a potential conversion point. If all function blocks written in the user program which represent said program module are modified, this prompts the specific conversion points to be marked. Even when the user program is written using text input, the marking results in the specific conversion points being highlighted.

In a further refinement of the invention, the execution of the user program involves that a duplicated non-safety-related program variable is generated from the selected first non-safety-related program variable.

This refinement has the advantage that for each of the two processing channels required for failsafe processing of safety-related program variables in a safety controller, an independent non-safety-related program variable is provided which is converted into a safety-related program variable independently in each case.

The duplicated non-safety-related program variable is advantageously generated by virtue of the instantaneous value of the selected first non-safety-related program variable being read into two independent memory areas, one of which is provided for the non-safety-related program variable and one of which is provided for the duplicated non-safety-related program variable.

Advantageously, the duplicated non-safety-related program variable is generated automatically by the computer program which is used for creating the user program. The writer of the user program does not need to perform any additional actions besides the actions which usually need to be performed for writing a user program.

The automatic generation of the duplicated non-safety-related program variable advantageously proceeds as follows: the display module is used to write a source code for the user program. When an identified code component is available, the identification module produces a duplication code which is inserted into the source code. On the basis of this duplication code, the duplicated non-safety-related program variable is then generated automatically on the basis of the selected first non-safety-related program variable when the user program is executed. Alternatively, an embodiment is conceivable in which explicit writing of a duplication code is not necessary. In this case, the firmware running on the safety controller stores a routine which automatically performs duplication or creates the instructions which are necessary for this purpose when, on the basis of an association, a non-safety-related program variable needs to be processed in the first program portion.

In a further refinement of the aforementioned measure, the assignment condition is processed both for the selected first non-safety-related program variable and for the duplicated non-safety-related program variable.

The following order is therefore stipulated: in a first step, the duplicated non-safety-related program variable is generated. In a second step, a check is then performed for both program variables to determine whether a respective reliability requirement demanded for safety-related program variables is met. This order of handling allows errors which occur during duplication to be identified, which helps to increase failsafety.

In a further refinement of the invention, the selected first non-safety-related program variable is a program input variable, wherein the instantaneous value which is assigned to the program input variable represents a value of a sensor signal which is generated using a sensor of non-failsafe design.

This measure has the advantage that safety tasks can be accomplished using inexpensive sensors of non-failsafe design. The use of an expensive sensor of failsafe design is not absolutely necessary. This allows inexpensive implementation of safety controllers.

Preferably, the instantaneous value of the selected further program variable is also provided using a sensor of non-failsafe design. Preferably, the sensor of non-failsafe design is one which is used to capture a physical variable which is needed for the standard tasks that are to be accomplished via the safety controller. This has the advantage that no further sensors need to be used besides the sensors which are needed for accomplishing the standard tasks. The safety controller can therefore be implemented inexpensively.

As already stated above, both the selected first non-safety-related program variable and the selected further program variable may each be a program input variable. Alternatively, these two program variables may also each be a program intermediate variable. By way of example, the instantaneous value of a program intermediate variable is determined on the basis of the instantaneous value of a program input variable. Alternatively, the two program variables may also each be a program output variable. By way of example, the instantaneous value of a program output variable is determined on the basis of the instantaneous value of a program input variable or the instantaneous value of a program intermediate variable and represents the value of a control output signal which is used to actuate an actuator. The selected first non-safety-related program variable and the selected further program variable do not necessarily need to be the same type of program variable. One of the conceivable combinations may also be present.

Advantageously, the selected safety-related program variable can be used as an intermediate variable on the basis of which a safety-related control output signal is ascertained, for example.

It goes without saying that the features cited above and those yet to be explained below can be used not only in the respectively indicated combination but also in other combinations or on their own without departing from the scope of the present invention.

BRIEF DESCRIPTION OF THE DRAWINGS

Exemplary embodiments of the invention are shown in the drawing and are explained in more detail in the description below. In the drawing.

DESCRIPTION OF PREFERRED EMBODIMENTS

Figure 1:
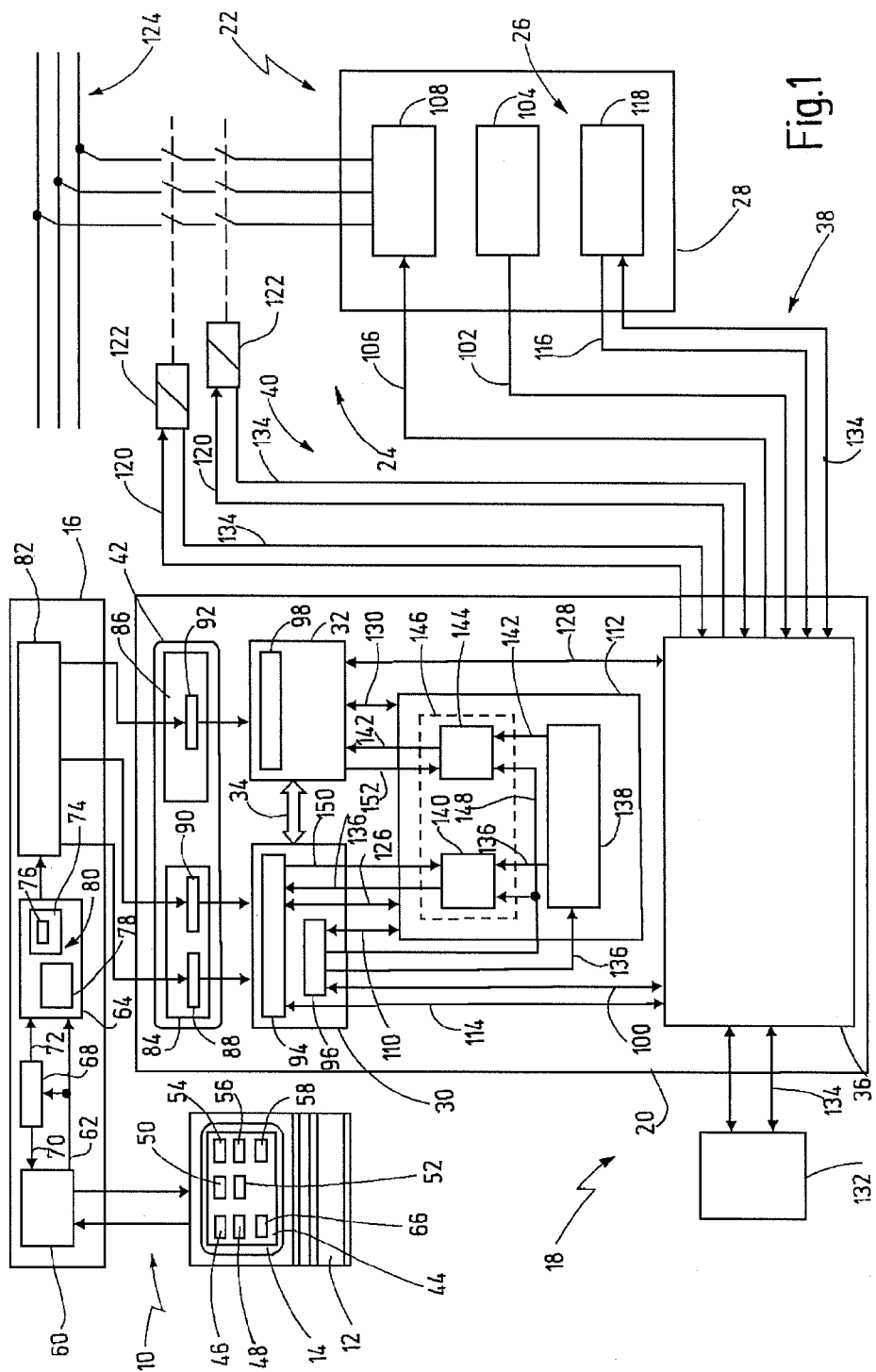
FIG. 1 shows a schematic illustration of the novel apparatus in conjunction with a safety controller for which a user program needs to be created.

In FIG. 1, an apparatus according to the invention is denoted by reference numeral 10 in its entirety.

The apparatus 10 has a conventional computer 12 having a display unit 14, on which computer a computer program 16 is executed. The computer program 16 allows a user program to be written for a safety controller. In specialist terminology, it is therefore also referred to as a programming tool. The computer 12 may be in the form of a PC and the display unit 14 may be in the form of a monitor.

FIG. 1 shows a safety circuit—denoted by the reference numeral 18 in its entirety—which has a safety controller 20 designed to control an automated installation—denoted by reference numeral 22 in its entirety. The automated installation 22 comprises a plurality of actuators 24 and a plurality of sensors 26. By way of example, a load 28 which the installation 22 contains is shown, which may be a robot, for example.

The safety controller 20 is of two-channel-redundant design in order to achieve the requisite failsafety for controlling safety-critical processes. To represent the two-channel design, FIG. 1 shows two separate processors, namely a first processor 30 and a second processor 32. The two processors 30, 32 are connected to one another by means of a bidirectional communication interface 34 so as to be able to control one another and interchange data. Preferably, the two channels of the safety controller 20 and the two processors 30, 32 are of diversitary, i.e. different, design in order to largely preclude systematic errors.

Reference numeral 36 denotes an input/output unit which is connected to each of the two processors 30, 32. The input/output unit 36 receives a plurality of control input signals 38 from the plurality of sensors 26 and forwards said signals in a customized data format to each of the two processors 30, 32. Assuming that the control input signals are analog signals, the analog values of the control input signals are converted by means of A/D conversion into digital values which are then assigned as instantaneous values to program input variables. In addition, the input/output unit 36 takes the processors 30, 32 as a basis for producing a plurality of control output signals 40 which are used to actuate the plurality of actuators 24. Assuming that the control output signals are analog signals, instantaneous values in digital form for program output variables are to this end converted by means of D/A conversion into analog values which then represent the values of the control output signals.

Reference numeral 42 denotes a program memory which is used to store a user program in the form of machine code. The user program and hence the machine code are written using the apparatus 10. If the program memory 42 is in the form of a chip card, this allows simple interchange of the machine code and hence of the user program even without a direct connection to the computer 12. Alternatively, the program memory 42 may also be in the form of a memory which is permanently installed in the safety controller 20, for example an EEPROM.

The computer program 16 provides a user interface 44 on the display unit 14. The user interface 44 allows a programmer to write a user program. The programmer writes the user program by supplying the computer 12 with inputs via an input unit which is connected to said computer. By way of example, the input unit may be a keyboard or a mouse. The input concepts may differ depending on the basis of the programming language used for writing the user program. If the programming language is a structured text programming language, for example, then the user program is written by means of text inputs. If, by contrast, a function block diagram is used as the programming language, the programmer writes the user program by using a mouse to select predefined program modules which are represented by means of graphical symbols on the user interface 44, for example.

Regardless of the programming language used, the novel method requires various inputs which the programmer needs to make. These inputs comprise the definition of a number of safety-related program variables 46, the definition of a number of non-safety-related program variables 48, the selection of a safety-related program variable 50 from the number of safety-related program variables 46, the selection of a first non-safety-related program variable 52 from the number of non-safety-related program variables 48, the definition of an assignment condition 54, the definition of an association 56 and the writing of control instructions 58. In terms of programming, the association 56 corresponds to an assignment which is used to assign the selected first non-safety-related program variable 52 to the selected safety-related program variable 50. When the user program is executed, this means that the instantaneous values of the non-safety-related program variable are assigned to the safety-related program variable. The association has the nature of mapping.

The computer program 16 comprises a display module 60. The display module 60 is used to capture and evaluate the inputs made by the programmer using the input unit. Firstly, the display module 60 produces a source code 62 which represents the respective input and which is stored in a source code memory 64. Compared to the complete source code which is present after the programmer has made all his inputs, source code 62 is a partial source code. Secondly, the display module 60 displays or presents graphical symbols 66 in a basic form of presentation. The graphical symbols 66 represent the inputs made by the programmer and hence also the source code 62 produced by the display module 60. It is therefore possible for the user program or the source code for the user program to be presented on the display unit 14.

The computer program 16 also comprises an identification module 68 in which the source code 62 is evaluated. The source code produced overall by the display module 60 contains conversion code which comprises a first code component and a second code component. The first code component represents the association 56 and the second code component represents the assignment condition 54. When the identification module 68 now identifies the first code component, the display module 60 is firstly supplied with an identification notification 70. On the basis of the identification notification 70, the display module 60 presents at least one of the graphical symbols 66 in a form of presentation which is modified in comparison with the basic form of presentation. Secondly, the identification module 68 produces a duplication code 72. The duplication code 72 is supplied to the source code memory 64 and hence inserted into source code. In this case, various refinements are conceivable. The duplication code 72 may be an independent program portion which exists independently of the first program portion 74 and the second program portion 78. Alternatively, the duplication code 72 may be part of the first program portion 74 or part of the second program portion 78.

When the programmer has made all the inputs required for his user program, the source code is completely available in the source code memory 64. The source code comprises a first program portion 74 for processing safety-related program variables in failsafe fashion. The first program portion 74 in turn comprises a program module 76, which is formed by combining the first code component and the second code component. On account of the functionality connected to the program module 76, the program module 76 can be referred to as a conversion module. In addition, the source code comprises a second program portion 78 for processing non-safety-related program variables, with failsafe processing not being necessary for the non-safety-related program variable within the second program portion 78. The first program portion 74 comprises that source code which represents the safety instructions which are required for the safety tasks that are to be accomplished by the safety controller 20. The safety instructions comprise not only safety control instructions but also conversion instructions with the conversion instructions representing the association 56 and the assignment condition 54. The conversion instructions are combined to form the program module 76. The conversion instructions combined in the program module 76 are independent from the actual safety control instructions. The second program portion 78 comprises that source code which represents the standard instructions which are required for the standard tasks that are to be accomplished by the safety controller 20.

The complete source code 80 stored in the source code memory 64 is translated into machine code by means of a compiler 82. Preferably, it is additionally protected by means of a CRC (Cyclic Redundancy Check).

The machine code translated by the compiler 82 is stored in the program memory 42. For failsafe processing of safety-related program variables, the program memory 42 stores a first machine code 84 and a second machine code 86. The first machine code 84 is intended for the first processor 30, and the second machine code 86 is intended for the second processor 32. The first machine code 84 comprises a first safety code 88 and a standard code 90. The first safety code 88 comprises firstly those safety instructions which need to be executed by the first processor 30 for the safety tasks that are to be accomplished by the safety controller 20. Secondly, the first safety code 88 comprises those safety instructions which need to be executed by the first processor 30 for the conversion which is defined by the association 56 and the assignment condition 54. Overall, the first safety code 88 therefore comprises safety control instructions and conversion instructions. The standard code 90 comprises those standard instructions which need to be executed by the first processor 30 for the standard tasks that are to be accomplished by the safety controller 20. The second machine code 86 comprises a second safety code 92. In line with the explanations relating to the first safety code 88, the second safety code 92 comprises those safety instructions, i.e. safety control instructions and conversion instructions, which need to be executed by the second processor 32. The user program written by the programmer comprises the complete source code 80 and the two machine codes 84, 86.

Based on the execution of the user program, the first processor 30 executes firstly a first current safety instruction 94 and secondly a current standard instruction 96. Essentially at the same time, the second processor 32 executes a second current safety instruction 98. Both the first current safety instruction 94 and the second current safety instruction 98 may be a safety control instruction or a conversion instruction.

In the execution of the current standard instruction 96, which is a standard control instruction and hence a non-safety-related control instruction, first non-safety-related data 100 are interchanged between the first processor 30 and the input/output unit 36. In this case, the first processor 30 is supplied with data using program input variables, wherein the instantaneous values thereof represent values of non-safety-related control input signals 102 which are produced by non-safety-related sensors 104. The non-safety-related sensors 104 are sensors of the kind that capture input variables which are required for closed-loop drive control, for example. These may be rotation speeds, angles or speeds, for example. The non-safety-related sensors 104 are of non-failsafe design. The input/output unit 36 is supplied with data using program output variables, wherein the instantaneous values thereof represent values of non-safety-related control output signals 106 which are supplied to non-safety-related actuators 108 in order to control them. By way of example, the non-safety-related actuators 108 may be motors or actuating cylinders. The instantaneous values of the non-safety-related program output variables are determined on the basis of the non-safety-related program input variables according to the standard instructions. In this case, it may be necessary to ascertain intermediate variables, the instantaneous values of which are assigned to program intermediate variables. The instantaneous values of the program intermediate variables are supplied by means of second non-safety-related data 110 to a main memory 112 and are buffer-stored therein.

If the first current safety instruction 94 is a safety control instruction and hence a safety-related control instruction, the handling thereof involves first safety-related data 114 being interchanged between the first processor 30 and the input/output unit 36. In this case, the first processor 30 is supplied with data using safety-related program input variables, with the instantaneous values thereof representing values of safety-related control input signals 116 which are produced by safety-related sensors 118. By way of example, the safety-related sensors 118 are emergency off pushbutton switches, two-hand controllers, guard doors, rotation speed monitoring appliances or other sensors for picking up safety-related parameters. The input/output unit 36 is supplied with data using safety-related program output variables, with the instantaneous values of the latter representing values of safety-related control output signals 120 which are supplied to safety-related actuators 122 in order to actuate them. By way of example, the safety-related actuators 122 are what are known as contactors, the operating contacts on which are arranged in the connection between a power supply 124 and the load 28. The safety-related actuators 122 can be used to disconnect the power supply 124 for the load 28, which means that it is possible to transfer at least the load 28 to a safe state when a relevant malfunction occurs. The instantaneous values of the safety-related program output variables are ascertained on the basis of the safety-related program input variables as per the safety control instructions. This may require safety-related intermediate variables to be ascertained, the instantaneous values of which are assigned to safety-related program intermediate variables. The instantaneous values of the safety-related program intermediate variables are supplied by means of second safety-related data 126 to the main memory 112 and are buffer-stored therein.

If the second current safety instruction 98 is a safety control instruction and hence a safety-related control instruction, the procedure is in accordance with the first current safety instruction 94 processed in the first processor 30. As far as the second current safety instruction 98 is concerned, third safety-related data 128, which correspond to the first safety-related data 114, and fourth safety-related data 130, which correspond to the second safety-related data 126, are used as appropriate.

The above explanations, according to which both the first processor 30 and the second processor 32 generate values for the safety-related control output signals 120, do not mean that the values generated by these two processors are output simultaneously as control output signals 120. The above explanations are merely intended to convey the redundant design of the safety controller 20 in respect of the safety tasks that are to be accomplished. Both processors 30, 32 are designed to determine values for the control output signals 120. During correct operation of the safety controller 20, only the values determined by one processor, for example the first processor 30, are output as control output signals 120.

The safety controller 20 may have further peripheral units 132, which are required for the standard and safety tasks that are to be accomplished by the safety controller 20, connected to it via the input/output unit 36. By way of example, these may be a mode selector switch or a confirm button. Alternatively, there may be a display unit.

The input/output unit 36 is used to interchange test signals 134 between the safety controller 20 and the safety-related sensors 118, the safety-related actuators 122 and, if necessary, also the further peripheral units 132. The test signals 134 can be used to establish in the safety controller 20 whether the units and components connected thereto are operating correctly, which is necessary, since it is necessary to ensure that the installation 22 to be controlled is in a safe state as soon as a malfunction occurs on an appliance which is connected to the safety controller 20.

If the first current safety instruction 94 and the second current safety instruction 98 are a conversion instruction, the two processors 30, 32 execute one of those steps which is necessary in order to assign an instantaneous value of the selected first non-safety-related program variable 52 to the selected safety-related program variable 50 on the basis of the assignment condition 54. To this end, an original instantaneous value 136—available at a defined time step—for the selected first non-safety-related program variable 52 is supplied to a duplication unit 138. In the duplication unit 138, the selected first non-safety-related program variable 52 is used to produce a duplicated non-safety-related program variable. For this, the original instantaneous value 136 is read into two separate memory areas. For the sake of clarity, these two memory areas are not shown. The two memory areas are read independently, so that the original instantaneous value 136 is supplied to a first checking unit 140 and a duplicated instantaneous value 142 is supplied to a second checking unit 144. The second checking unit 144 therefore evaluates and hence processes a duplicated non-safety-related program variable.

The two checking units 140, 144 together form a plausibility unit 146. The duplication unit 138 and the plausibility unit 146 can be considered, in combination, to be a conversion unit. At this occasion, it should be mentioned that the duplication unit 138, the checking units 140, 144 and the plausibility unit 146 are all functional units rather than structural units within the main memory 112.

The two checking units 140, 144 execute the assignment condition 54 independently. The first checking unit 140 executes it for the selected first non-safety-related program variable 52, and the second checking unit 144 executes it for the duplicated non-safety-related program variable. Hence, it is established both for the selected first non-safety-related program variable 52 and for the duplicated non-safety-related program variable whether said reliability requirement is met in each case.

Two embodiments are conceivable for the assignment condition 54. In a first embodiment, the assignment condition defined is a plausibility test which is used to check whether the selected first non-safety-related program variable 52 and a selected further program variable are consistent with one another. Accordingly, a check is performed to determine whether the duplicated non-safety-related program variable and the selected further program variable are consistent with one another. If the selected further program variable is a non-safety-related program variable, the two checking units 140, 144 are supplied with a first instantaneous value 148 which is available at the defined time step. This is an instantaneous value for a selected further non-safety-related program variable. If the first checking unit 140 establishes that the selected first non-safety-related program variable 52 and the selected further non-safety-related program variable are consistent with one another, the original instantaneous value 136 is assigned to the selected safety-related program variable 50 and is output to the first processor 30. If the second checking unit 144 establishes that the duplicated non-safety-related program variable and the selected further non-safety-related program variable are consistent with one another, the duplicated instantaneous value 142 is assigned to a safety-related program variable which corresponds to the selected safety-related program variable 50, which has been created in the second safety code 92 and which is processed in the second processor 32, and is output to the second processor 32.

If, by contrast, the selected further program variable is a safety-related program variable, the first checking unit 140 is supplied with a second instantaneous value, available at the defined time step, by means of fifth safety-related data 150. This is an instantaneous value for a selected further safety-related program variable. Accordingly, the second checking unit 144 is supplied with a third instantaneous value, available at the defined time step, by means of sixth safety-related data 152. This is the instantaneous value of an appropriate safety-related program variable created in the second safety code 92. The first checking unit 140 then establishes whether the selected first non-safety-related program variable 52 and the selected further safety-related program variable are consistent with one another. The second checking unit 144 then establishes whether the selected first non-safety-related program variable 52 and the corresponding safety-related program variable used in the second safety code 92 are consistent with one another. The original instantaneous value 136 and the duplicated instantaneous value 144 are assigned and output on the basis of the case that the selected further program variable is a non-safety-related program variable.

In a second embodiment, the assignment condition defined is a plausibility test which is used to check whether the selected first non-safety-related program variable 52 meets a comparison criterion, wherein the comparison criterion represents a characteristic property of the selected first non-safety-related program variable 52. In this case, the first checking unit 140 is supplied with comparison data by means of the fifth safety-related data 150, said comparison data having the original instantaneous value 136 compared with them. The second checking unit 144 is supplied with appropriate comparison data by means of the sixth safety-related data 152. If the first checking unit 140 establishes that the selected first non-safety-related program variable 52 meets the comparison criterion, the original instantaneous value 136 is assigned to the selected safety-related program variable 50 and is output to the first processor 30. If the second checking unit 144 establishes that the duplicated non-safety-related program variable meets the comparison criterion, the duplicated instantaneous value 142 is assigned to a safety-related program variable which has been created in the second safety code and which corresponds to the selected safety-related program variable 50, and is output to the second processor 32.

If the checking of the assignment condition 54 in the two checking units 140, 144 requires a plurality of instantaneous values or changes in the instantaneous values over time to be evaluated, the two checking units 140, 144 buffer-store the instantaneous values which are available for a plurality of successive time steps.

FIG. 1 describes a first embodiment in which both the first safety code 88 and the second safety code 92 contain the conversion instructions. This is not intended to have any restricting effect. An embodiment is also conceivable in which only the first safety code 88 contains the conversion instructions, and the second safety code 92 does not. An embodiment is also conceivable in which one or both safety codes contain(s) only those conversion instructions which represent the assignment condition 54. As far as the duplication code 72 is concerned, a plurality of embodiments are likewise conceivable. It is conceivable for only the first safety code 88 to contain associated instructions. Alternatively, both safety codes 88, 92 may contain associated instructions.

Figure 2:
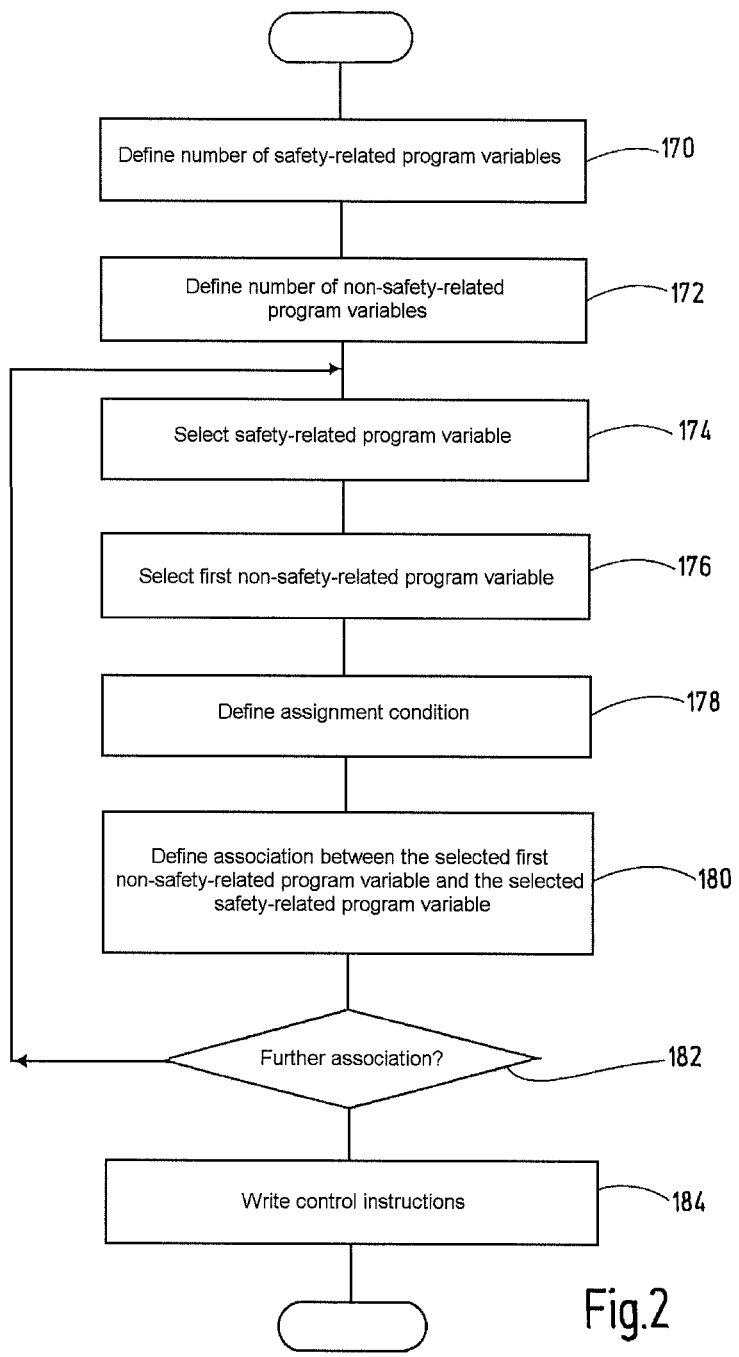
FIG. 2 shows a simplified flowchart to explain the novel method.

The flowchart shown in FIG. 2 shows the basic approach when creating a user program according to the novel method.

In step 170, a number of safety-related program variables 46 are defined. In a next step 172, a number of non-safety-related program variables 48 are defined. In a subsequent step 174, a safety-related program variable 50 is selected from the number of safety-related program variables 46. In a subsequent step 176, a first non-safety-related program variable 52 is selected from the number of non-safety-related program variables 48. The selected first non-safety-related program variable 52 is repeatedly assigned an instantaneous value when the user program is executed. In a subsequent step 178, an assignment condition 54 is defined which is processed when the user program is executed. In step 178, if the assignment condition defined is a plausibility test, a further program variable is additionally selected. In a subsequent step 180, an association 56 is defined which associates the selected first non-safety-related program variable 52 with the selected safety-related program variable 50. When the user program is executed, the instantaneous value of the selected first non-safety-related program variable 52 is assigned to the selected safety-related program variable 50 on the basis of the assignment condition 54. If a further non-safety-related program variable needs to be converted into a safety-related program variable, i.e. a further association needs to be performed, which is established in a subsequent step 182, then steps 174 to 180 are executed again. If, by contrast, no further conversion and hence association needs to be performed then step 182 is followed by the execution of a step 184. In step 184, control instructions are written.

Figure 3:
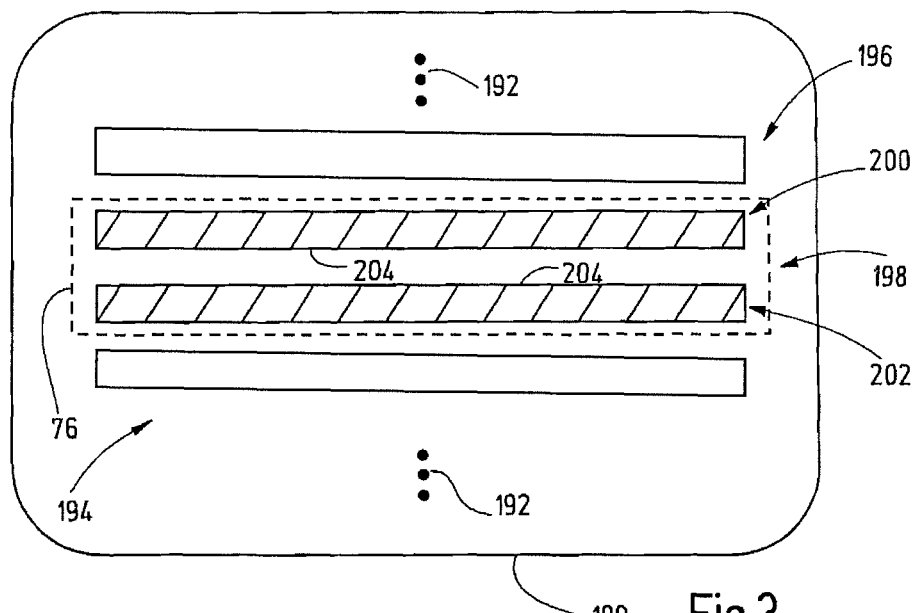
FIG. 3 shows a simplified illustration of a first graphical interface for creating a user program.

FIG. 3 shows a first graphical user interface 190, which represents a first programming concept. Overall, the user program is written using a computer program 16 which is executed on the computer 12. In this context, the first graphical user interface 190 allows a programmer to make text inputs which are required for writing a user program. The display module 60 which the computer program 16 comprises displays at least the source code 62 or, at least in excerpts, a portion of the complete source code 80 on the display unit 14 connected to the computer 12 while the user program is being written. In the explanations below, an excerpt from a source code is considered by way of simplification.

FIG. 3 shows the excerpt from the source code and hence from the user program, as indicated by continuation dots 192 and a number of rectangles 194, each of the rectangles representing a program line from the source code and hence from the user program. Overall, the first graphical user interface 190 presented on the display unit 14 comprises a plurality of graphical source code symbols 196 representing the source code. In this case, the graphical source code symbols are embodied in a basic form of presentation. The plurality of graphical source code symbols 196 comprises a number of graphical conversion code symbols 198. The number of graphical conversion code symbols 198 represents a conversion code which the source code contains. The conversion code in turn comprises a first code component 200, which represents the association 56, and a second code component 202, which represents the assignment conditions 54. The identification module 68 is used to identify at least one of the two code components 200, 202. When an identified code component is available, the display module 60 presents at least one graphical conversion code symbol 204 which the number of graphical conversion code symbols 198 contains in a form of presentation which is modified in comparison with the basic form of presentation. This is indicated in FIG. 3 by virtue of the two rectangles denoted by the reference numeral 204 being provided with hatching.

The first code component 200 represents conversion instructions which represent the association 56. The second code component 202 represents conversion instructions which represent the association condition 54. As indicated in FIG. 3 by a block which is shown in dashed lines, the two code components 200, 202 are combined to form the program module 76.

The presentation of at least one graphical conversion symbol 204 in a form of presentation which is modified in comparison with the basic form of presentation provides a detected conversion point within the source code and hence within the user program.

Figure 4:
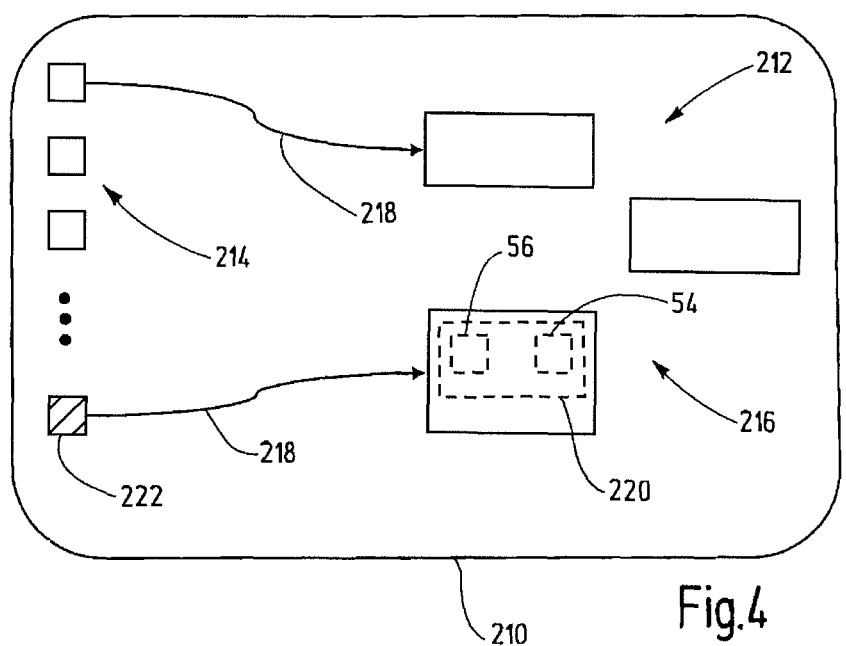
FIG. 4 shows a simplified illustration of a second graphical interface for creating a user program.

FIG. 4 shows a second graphical user interface 210, which represents a second programming concept. In the case of this second programming concept too, the user program is written using a computer program 16 which is executed on the computer 12. In the case of this second programming concept, however, the user program is written by selecting a number of program modules from a plurality of predefined program modules. In order to be able to make this selection, the display module 60 displays a plurality of graphical program module symbols 212 on the second graphical user interface 210 and hence the display unit 14. The plurality of graphical program module symbols 212 in turn comprises a first number of graphical program module symbols 214, which represent the predefined program modules, and a second number of graphical program module symbols 216, which represent the number of selected program modules. Predefined program modules are selected using a mouse, for example, by means of a drag-and-drop function, said selection being indicated in FIG. 4 by means of two arrows 218. At least the first number of graphical program module symbols 214 is embodied in a basic form of presentation. The number of predefined program modules comprises a program module 220 which was written during the writing of the user program and which represents the association 56 and the assignment condition 54. The written program module 220 is represented by at least one modified graphical program module symbol 222. The display module 60 displays the modified graphical program module symbol 222 in a form of presentation which is modified in comparison with the basic form of presentation. This is indicated in FIG. 4 by the use of hatching. The written program module 220 corresponds to the program module 76 described previously.

In the case of the second programming concept, the writing of a program module is presented as follows: the programmer uses an input field provided specifically for this purpose to stipulate the functionality of the program module that is to be written. To this end, the programmer inputs—for example in the form of text inputs—those control instructions which need to be executed by the program module that is to be written. At this stage, a graphical program module symbol is already being written for the program module that is to be written. When the identification module 68 now identifies one of the two code components 200, 202 within the control instructions which have been input by the programmer, the already created graphical program module symbol is modified, as a result of which it is displayed in a form of presentation which is modified in comparison with the basic form of presentation.

What is claimed is:

1. A method performed using one or more processors for creating a user program for a safety controller which is designed to control an automated installation having a plurality of sensors and a plurality of actuators, wherein the user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion, the method comprising the following steps:

defining a number of safety-related program variables, defining a number of non-safety-related program variables, selecting a safety-related program variable from the number of safety-related program variables, selecting a first non-safety-related program variable from the number of non-safety-related program variables, wherein the first non-safety-related program variable is repeatedly assigned an instantaneous value when the user program is executed, defining at least one assignment condition which is processed when the user program is executed, wherein the at least one assignment condition represents a plausibility test used to determine whether the selected first non-safety-related program variable meets a defined reliability requirement which is demanded for safety-related program variables, and defining an association which associates the selected first non-safety-related program variable with the selected safety-related program variable, wherein the instantaneous value of the selected first non-safety-related program variable is assigned to the selected safety-related program variable depending on the assignment condition, when the user program is executed, and wherein the selected first non-safety-related program variable is a program input variable, and the instantaneous value assigned to the program input variable represents a value of a sensor signal generated using a sensor of a non-failsafe design.

2. The method of claim 1, wherein the plausibility test is used to check whether the selected first non-safety-related program variable and a selected further program variable are consistent with one another.

3. The method of claim 1, the plausibility test is used to check whether the selected first non-safety-related program variable meets a comparison criterion, wherein the comparison criterion represents a defined characteristic property of the selected first non-safety-related program variable.

4. The method of claim 1, wherein the user program comprises a plurality of conversion instructions, wherein the conversion instructions represent the association and the assignment condition, wherein at least some of the conversion instructions are contained in the first program portion.

5. The method of claim 1, wherein a first code component representing the association and a second code component representing the assignment condition are combined to form a program module.

6. The method of claim 1, wherein the user program is created using a computer program running on a computer, wherein the computer program comprises a display module, wherein the display module causes a user program source code to be displayed on a display unit connected to the computer during the creation of the user program by means of a plurality of graphical source code symbols representing said source code, wherein the graphical source code symbols are implemented in a basic form of presentation, wherein the plurality of graphical source code symbols comprises a number of graphical conversion code symbols which represent a conversion code contained in the source code, wherein the conversion code comprises a first code component, which represents the association, and a second code component, which represents the assignment condition, wherein the computer program also comprises an identification module which is used to identify at least one of the two code components, wherein the presence of an identified code component causes the display module to present at least one graphical conversion code symbol, which is contained in the number of graphical conversion code symbols, in a form of presentation which is modified in comparison with the basic form of presentation.

7. The method of claim 6, wherein the identification module is used to identify the first code component.

8. The method of claim 1, wherein the user program is created using a computer program running on a computer, wherein the user program is created by selecting a number of program modules from a plurality of predefined program modules, wherein the computer program comprises a display module which displays a plurality of graphical program module symbols on a display unit connected to the computer, wherein the plurality of graphical program module symbols comprises a first number of graphical program module symbols which represent the predefined program modules, and a second number of graphical program module symbols which represent the number of selected program modules, wherein at least the first number of graphical program module symbols are implemented in a basic form of presentation, wherein the number of predefined program modules comprises a program module which was written during the creation of the user program and which represents the association and the assignment condition, wherein the written program module is represented by at least one modified graphical program module symbol, wherein the display module displays the modified graphical program module symbol in a form of presentation which is modified in comparison with the basic form of presentation.

9. The method of claim 1, wherein execution of the user program involves that a duplicated non-safety-related program variable is generated from the selected first non-safety-related program variable.

10. The method of claim 9, wherein the assignment condition is processed both for the selected first non-safety-related program variable and for the duplicated non-safety-related program variable.

11. An apparatus includes one or more processors for creating a user program for a safety controller designed to control an automated installation having a plurality of sensors and a plurality of actuators, wherein the user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion, the apparatus comprising:

first units for defining a number of safety-related program variables and for selecting a safety-related program variable from the number of safety-related program variables, second units for defining a number of non-safety-related program variables and for selecting a first non-safety-related program variable from the number of non-safety-related program variables, wherein the first non-safety-related program variable is repeatedly assigned an instantaneous value during the execution of the user program, third units for defining at least one assignment condition which is processed during the execution of the user program, wherein the at least one assignment condition represents a plausibility test used to determine whether the selected first non-safety-related program variable meets a defined reliability requirement which is demanded for safety-related program variables, and fourth units for defining an association which associates the selected first non-safety-related program variable with the selected safety-related program variable, wherein the instantaneous value of the selected first non-safety-related program variable is assigned to the selected safety-related program variable on the basis of the assignment condition when the user program is executed, and wherein the selected first non-safety-related program variable is a program input variable, and the instantaneous value assigned to the program input variable represents a value of a sensor signal generated using a sensor of a non-failsafe design.

12. A non-transitory computer readable storage medium containing an operating program for carrying out a method for creating a user program for a safety controller which is designed to control an automated installation having a plurality of sensors and a plurality of actuators, wherein the user program comprises a first program portion, in which safety-related program variables are processed in failsafe fashion, and comprises at least one second program portion, in which non-safety-related program variables are processed, wherein failsafe processing is not necessary for the non-safety-related program variables within the second program portion, the method comprising the following steps:

defining a number of safety-related program variables, defining a number of non-safety-related program variables, selecting a safety-related program variable from the number of safety-related program variables, selecting a first non-safety-related program variable from the number of non-safety-related program variables, wherein the first non-safety-related program variable is repeatedly assigned an instantaneous value when the user program is executed, defining at least one assignment condition which is processed when the user program is executed, wherein the at least one assignment condition represents a plausibility test used to determine whether the selected first non-safety-related program variable meets a defined reliability requirement which is demanded for safety-related program variables, and defining an association which associates the selected first non-safety-related program variable with the selected safety-related program variable, wherein the instantaneous value of the selected first non-safety-related program variable is assigned to the selected safety-related program variable depending on the assignment condition, when the user program is executed, and wherein the selected first non-safety-related program variable is a program input variable, and the instantaneous value assigned to the program input variable represents a value of a sensor signal generated using a sensor of a non-failsafe design.

* * * * *